US011285775B2

(12) United States Patent
Bergfeld et al.

(10) Patent No.: US 11,285,775 B2
(45) Date of Patent: Mar. 29, 2022

(54) CONTROLLABLE VIBRATION DAMPER

(71) Applicant: Kendrion (Villingen) GmbH, Villingen-Schwenningen (DE)

(72) Inventors: Björn Bergfeld, Balingen-Endingen (DE); Frank Zelano, St. Georgen (DE); Holger Brandenburg, Villingen-Schwenningen (DE)

(73) Assignee: Kendrion (Villingen) GmbH, Villingen Schwenninge (DE)

( * ) Notice: Subject to any disclaimer, the term of this patent is extended or adjusted under 35 U.S.C. 154(b) by 196 days.

(21) Appl. No.: 16/615,718

(22) PCT Filed: May 2, 2018

(86) PCT No.: PCT/EP2018/061133
§ 371 (c)(1),
(2) Date: Nov. 21, 2019

(87) PCT Pub. No.: WO2018/215176
PCT Pub. Date: Nov. 29, 2018

(65) Prior Publication Data
US 2020/0171908 A1 Jun. 4, 2020

(30) Foreign Application Priority Data
May 22, 2017 (DE) ...................... 10 2017 111 157.3

(51) Int. Cl.
*F16F 9/34* (2006.01)
*B60G 17/08* (2006.01)
*B60G 13/08* (2006.01)
*F16F 9/19* (2006.01)
(Continued)

(52) U.S. Cl.
CPC ............ *B60G 17/08* (2013.01); *B60G 13/08* (2013.01); *F16F 9/19* (2013.01); *F16F 9/34* (2013.01);
(Continued)

(58) Field of Classification Search
CPC ........ F16F 9/325; F16F 9/3405; F16F 9/3481; F16F 9/465
(Continued)

(56) References Cited

U.S. PATENT DOCUMENTS 4,986,393 A * 1/1991 Preukschat ............ B60G 17/08
188/266.6
5,147,018 A 9/1992 Yoshinori et al.
(Continued)

FOREIGN PATENT DOCUMENTS

DE 3803888 8/1989
DE 102015201528 8/2015
(Continued)

OTHER PUBLICATIONS

World Intellectual Property Organization, "International Search Report," and English translation thereof, issued in International Application No. PCT/EP2018/061133, dated Oct. 9, 2018, document of 6 pages.

*Primary Examiner* — Christopher P Schwartz
(74) *Attorney, Agent, or Firm* — Akerman LLP; Peter A. Chiabotti

(57) ABSTRACT

A controllable shock absorber, in particular for motor vehicles, comprising a valve device comprising a bridge circuit with four non-return valves which are connected crosswise in the forward direction, the connection of a first bridge branch with two non-return valves that are arranged opposite each other form a pressure chamber and the connection of the second bridge branch with two non-return valves arranged opposite each other form a low pressure chamber, a hydraulic main slide arranged between the low pressure chamber and the pressure chamber, a pilot chamber which is connected to the pressurised fluid line which is part of the upper working space (traction area) by means of a fifth non-return valve, and a pilot valve which connects the low
(Continued)

pressure chamber to the pilot chamber, the pilot chamber being connected to the high-pressure chamber by means of a diaphragm.

19 Claims, 14 Drawing Sheets

(51) Int. Cl.
    *F16F 9/50*    (2006.01)
    *F16F 9/46*    (2006.01)

(52) U.S. Cl.
    CPC ............ *F16F 9/50* (2013.01); *B60G 2202/24* (2013.01); *B60G 2500/112* (2013.01); *B60G 2800/162* (2013.01); *F16F 9/46* (2013.01); *F16F 9/465* (2013.01); *F16F 2222/12* (2013.01); *F16F 2228/066* (2013.01)

(58) Field of Classification Search
    USPC ................ 188/266.5, 282.3, 282.5, 315
    See application file for complete search history.

(56) References Cited

U.S. PATENT DOCUMENTS

| | | | |
|---|---|---|---|
| 5,501,307 A | 3/1996 | Lars | |
| 6,394,238 B1* | 5/2002 | Rogala | B60G 13/14 188/266.2 |
| 8,651,251 B2* | 2/2014 | Preukschat | F16F 9/512 188/282.4 |
| 8,997,952 B2 | 4/2015 | Goetz | |
| 9,597,941 B2* | 3/2017 | Yamashita | F16F 9/465 |
| 9,879,744 B2* | 1/2018 | Haller | B60G 99/002 |
| 2005/0016086 A1 | 1/2005 | Haruhiko et al. | |
| 2013/0299291 A1* | 11/2013 | Ewers | F16F 9/465 188/322.13 |
| 2015/0217621 A1 | 8/2015 | Yamashita | |
| 2016/0091044 A1* | 3/2016 | Murakami | F16F 9/18 188/313 |
| 2016/0369862 A1 | 12/2016 | Naoya et al. | |
| 2017/0057317 A1 | 3/2017 | Schmidt et al. | |
| 2017/0234396 A1* | 8/2017 | Hamers | F16F 9/3405 188/282.2 |

FOREIGN PATENT DOCUMENTS

| | | |
|---|---|---|
| EP | 2470809 | 3/2015 |
| JP | 3781461 | 5/2006 |
| JP | 2009115319 | 5/2009 |
| WO | 9308416 | 4/1993 |
| WO | 2015169529 | 11/2015 |
| WO | 2016066314 | 5/2016 |

* cited by examiner

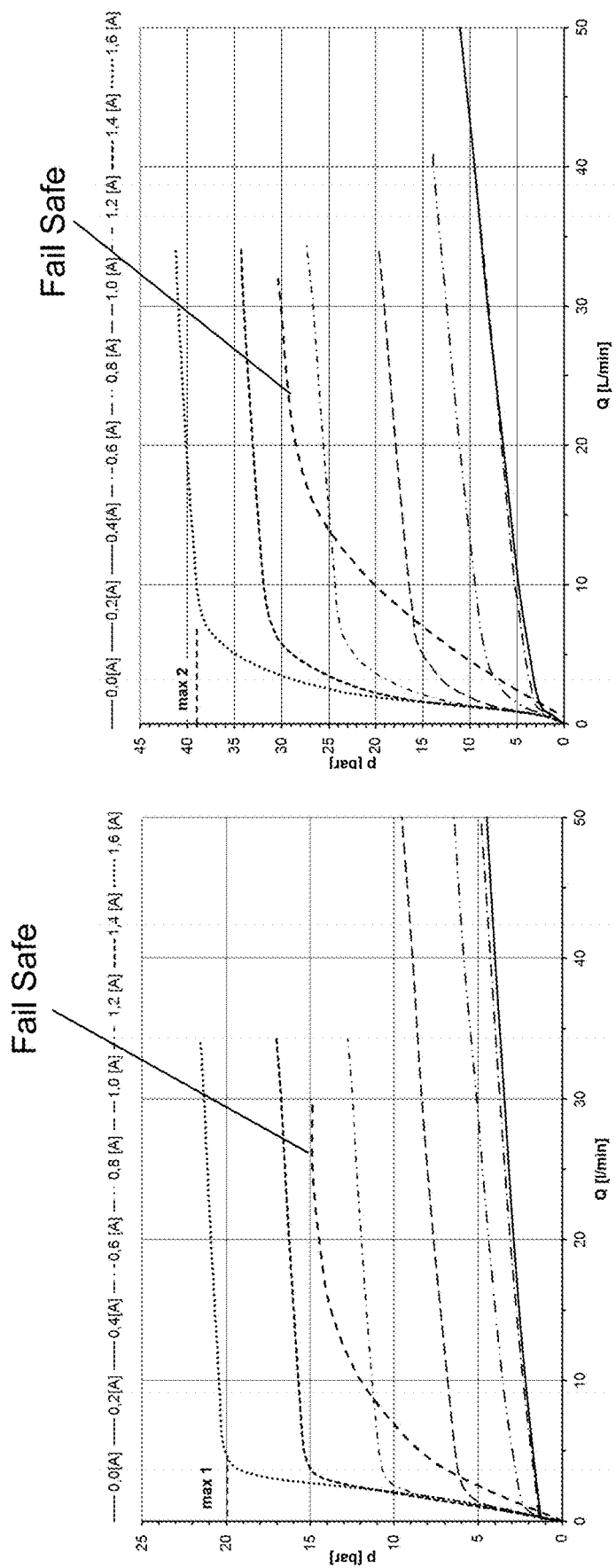

CONTROLLABLE VIBRATION DAMPER

CROSS REFERENCE TO RELATED APPLICATIONS

This application is a §371 National Phase of PCT/EP2018/061133, filed May 2, 2018, the entirety of which is incorporated by reference and which claims priority to German Patent Application No. 10 2017 111 157.3, filed May 22, 2017.

BACKGROUND

The application relates to a controllable vibration damper, in particular for motor vehicles, with a piston movable back and forth within a working cycle dividing the operating cylinder into an upper operating volume (rebound volume) and a lower operating volume (compression volume) wherein both operating volumes are connected across a pressurizing medium line with a valve device.

SUMMARY

Such controllable vibration dampers are disclosed for example in DE 38 03 888 C2 and are exploited in particular for the control of the vibration of motor vehicles in order to adapt the vehicle to the requirements of the driving route. This can take place independently and automatically in a control system of the motor vehicle. However, it is also feasible for the vibration force course to be set manually by the driver. The design engineering implementation of the vibration damper is routinely realized such that it becomes feasible to detect the motion of platform and wheel suspension and to select a high damping force in such movement states in which the direction of the generated vibration force is directed oppositely to the movement of the vehicle platform. A low damping force is routinely selected if the damping force and the platform movement of the vehicle are aligned in the same direction. However, in this case the driver can increasingly more frequently also set the desired damping force manually in motor vehicles. In DE 38 03 888 C2 the valve device connected to the operating cylinder comprises for this purpose two damping elements that can be switched individually or jointly into the flow path and that comprise two check or non-return valves connected antiparallel for the rebound and compression damping. The check valves are herein laid out such that a first damping element in rebound damping has a high damping force and in compression damping a low damping force, while the other damping element with two antiparallel connected check valves generates a low damping force in rebound damping and a high damping force in compression damping. However, with such a vibration damper only two different damping characteristics are possible in compressive and tensile loading (of the piston).

EP 2 470 809 B1 discloses a different controllable vibration damper. The shock absorber described herein for a wheel suspension of a motor vehicle is provided with a valve device that is installed within a damper cylinder or alternatively as an operating cylinder. The valve device described here comprises two main slide-gates designated as damping valves which are connected across a back-and-forth switchable control valve. In addition, the valve device connected to the operating cylinder described here comprises several check valves. The problem entailed in this known damper configuration is the fact that two main slide-gates are utilized and the configuration is thus structurally complex.

Further vibration dampers are disclosed in US 2016 0369 862 A1, JP 2009 115 319 A, U.S. Pat. No. 5,147,018 A and US 2005 0016 086 A1.

The invention application addresses the problem of providing a controllable vibration damper, in particular for motor vehicles, which, in comparison to the known controllable vibration dampers, comprises only a single main slide-gate and is therefore structurally simple and thus cost-efficient of production. The vibration damper can have a high degree of flexibility with respect to the setting of the damper characteristic of the vibration damper.

This problem is resolved through a controllable vibration damper having the features and structures recited herein.

The controllable vibration damper is suitable in particular for the wheel suspension in motor vehicles and comprises a piston movable back and forth in an operating cylinder (damper tube), which piston divides the operating cylinder into an upper operating volume (rebound volume) and a lower operating volume (compression volume). Both operating volumes are herein connected across a pressurizing medium line with a valve device which comprises the following:
- a bridge circuit with four check valves connected crosswise in the forward direction, wherein the connection of a first bridge section frames with two oppositely connected check valves a high pressure chamber and the connection of the second bridge section with two opposite check valves frames a low pressure chamber,
- a hydraulic main slide-gate disposed between the low pressure chamber and high pressure chamber,
- a pilot chamber which is preferably in connection with the pressurizing medium line associated with the upper operating volume (rebound volume) across a fifth check valve,
- a pilot valve, across which the pilot chamber is in connection with the low pressure chamber, wherein the pilot chamber is in connection across an aperture with the high pressure chamber.

The application is substantially distinguished thereby that the valve device comprises only a single main slide-gate which is operationally connected with a controlled pilot valve, in particular a controlled electromagnetic (solenoid) pilot valve. In order for only a single hydraulic main slide-gate being required, a bridge circuit of four check valves is provided which are connected crosswise in the forward direction. Through the controller, in particular the power control of the pilot valve, the different pressure characteristics can be set in the rebound or compression movement of the piston in the operating volume.

The application provides for the pilot chamber to be in connection with the high pressure chamber across a first aperture. In the case in which the pilot chamber is in connection across the fifth check valve with the pressurizing medium volume associated with the upper operating volume, a further aperture is preferably disposed between the fifth check valve and the pilot chamber. The further aperture is alternatively disposed between the pressurizing medium line associated with the upper operating volume and the fifth check valve. By selecting the size of the two apertures acting as a throttle (restriction), pressure differences in the pilot chamber and in the high pressure chamber can be set, whereby the characteristics for the compression volume and rebound volume are variable. However, the apertures can in principle also be of equal size. Depending on the application case, it is however also feasible to select the apertures to be of different sizes. Furthermore, with the disposition of the further aperture the natural vibration tendency of the vibration damper can be reduced.

It is provided in a further development for the four check valves of the bridge circuit to comprise settable spring elements, for example spring seats. By setting the resiliency of these spring elements, it is feasible to determine the pressures at which the particular check valves open. A basic characteristic of the damper response of the controllable vibration damper is hereby definable.

A further development provides for the main slide-gate as well as also the pilot valve to be connected in each instance across a hydraulic control line with the pilot chamber. This hydraulic control line is intended for the purpose of pressure transmission in order to affect the equilibrium of forces.

An embodiment of the application provides for the pressurizing medium line connected with the lower operating volume to be connected with a base valve. Moreover, between the two pressurizing medium lines a so-called blow-off valve, known per se, can be interconnected. The blow-off valve serves herein for setting a maximally attainable damper force at the vibration damper. For this purpose the blow-off valve is comprised, for example, of two anti-parallel-connected check valves, each with an aperture connected upstream.

The base valve installed in the bottom of the operating cylinder has the purpose of generating a basic damping. In addition, the overall system can be modulated hereby.

In a preferred embodiment of the application a pilot valve is developed as a 3/3 proportional valve, wherein between an output of this pilot valve and the low pressure chamber a third aperture is connected. This third aperture has a safety function. If the power of the electromagnetic (solenoid) pilot valve were to fail, this aperture ensures that a "middle damping characteristic" remains in the vibration damper. A condition herefor is, however, the suitable dimensioning of this third aperture. A similar safety function can be achieved if the aperture is replaced by an aperture check valve.

A further development of the application provides for a fourth aperture to be provided parallel to a check valve at the output of the 3/3 proportional pilot valve. By providing this measure, overshooting in the damping characteristic of the vibration damper can be avoided.

According to a yet further development of the proposed vibration damper, the pilot valve comprises a magnet through which through-flow of a pressurizing medium is enabled. Due to the through-flow of the magnet, the heat generated during operation can be particularly well dissipated from the magnet if the pressurizing medium is a fluid.

In an even further development the magnet comprises a tappet (rod) movable along a longitudinal axis which with a first end actuates a closure element and with the first end projects into the low pressure chamber and with a second end projects into a magnet chamber. By magnet are to be understood all units required for actuating the closure element, for example the tappet, an armature and coils. The units of the magnet are to be substantially disposed in the magnet chamber. Thereby that the tappet is disposed such that it projects with its two ends in each instance into a different chamber, pressure differences between the chambers can be of use in order to generate closing and opening forces acting on the tappet. In this way the forces to be applied by the magnet for moving the tappet can be reduced and be replaced by the forces at least partially generated by the fluid. The energy consumption of the vibration damper can thus be decreased. Moreover, the pressure differences can be exploited to set certain opening or closing behaviour of the pilot valve, for example the opening or closing starting at a specific pressure difference.

According to a further development the tappet comprises a channel through which pressurizing medium can flow and which fluidically connects the low pressure chamber and the magnet chamber. By providing the channel not only the through-flow for the heat dissipation is provided but also the feasibility is opened for creating specific dependencies between the pressures of the magnet chamber and the low pressure chamber. With the disposition and the diameters of the outputs of the channel, the opening and closing forces acting onto the tappet can be affected in order to set specific opening or closing behaviours of the pilot valve.

A still further development specifies for the tappet to be implemented in the form of a cylinder with a first diameter, the closure element with a second diameter differing from the first diameter, and the channel of the tappet to be connected at the first end of the tappet with an aperture and/or on the second end of the tappet with an aperture. The size of the aperture or of the apertures is herein adapted to the first diameter and/or to the second diameter. For structural reasons it can be unavoidable to provide the tappet with a different diameter than the closure element. It can thus be possible that the bearings for bearing the tappet are only available in certain diameters, however the closure elements having diameters differing therefrom. Due to these different diameters, the faces, cooperating with the pressurizing medium, from which result the opening and closing forces acting onto the closure element and the tappet, are in most cases different, which can lead to undesirable opening and closing behaviour of the pilot valve. For example, operating states can occur in which the pilot valve does not open at all, or, starting at a certain volume flow through the pilot valve, opens abruptly and consequently uncontrollably. Thereby that the pressurizing medium, before entering the channel and/or after leaving it, must flow through an aperture, a controlled opening and closing behaviour can be set through the selection of the size of the apertures. It can hereby be prevented that the pilot valve does not open at all or without control. Based thereon it follows that the phrase "connected with an aperture" is to be understood in particular as a fluidic connection such that the aperture or the apertures can affect the pressures acting onto the particular ends of the tappet and consequently the opening and closing forces acting onto the tappet.

An alternative embodiment relates to a controllable vibration damper, in particular for motor vehicles, with a piston movable back and forth in an operating cylinder, which piston divides the operating cylinder into an upper operating volume (rebound volume) and a lower operating volume (compression volume), wherein both operating volumes are connected with a valve device across a pressurizing medium line in each instance and the valve device comprises the following:

- a bridge circuit with four check valves connected crosswise in the forward direction, wherein the connection of a first bridge section together with two oppositely connected check valves frames a high pressure chamber, and the connection of the second bridge section with two further opposite check valves frames a low pressure chamber,
- a hydraulic main slide-gate disposed between the low pressure chamber and high pressure chamber,
- a pilot chamber, and
- a controlled pilot valve across which the pilot chamber is in connection with the low pressure chamber, wherein the pilot chamber is in connection with the high pressure chamber across an aperture.

In this embodiment the pilot chamber is not directly connected to the pressurizing medium line associated with the rebound volume. However, the above described effects can nevertheless also be attained in this embodiment.

In a further developed embodiment the pilot valve comprises a magnet through which a pressurizing medium is enabled to flow. Due to the through-flow of the magnet, the heat generated during operation can be especially well dissipated from the magnet if the pressurizing medium is a fluid.

According to yet a further embodiment the magnet comprises a tappet, movable along a longitudinal axis, which actuates with a first end a closure element and projects with the first end into the pilot chamber and with a second end projects into a magnet chamber. Thereby that the tappet is disposed such that it projects with each of its two ends into a different chamber, pressure differences between the chambers can be of use to generate specifically opening or closing forces acting onto the tappet. In this way the forces to be applied for moving the tappet by the magnet can be reduced and be replaced at least partially by forces generated by the fluid. The energy consumption of the vibration damper can thus be decreased. Moreover, the pressure differences can be exploited to set certain opening or closing behaviours of the pilot valve, for example the opening or closing starting at a specific pressure difference.

According to yet a further development the tappet comprises a channel through which pressurizing medium is enabled to flow and which fluidically connects the pilot chamber and the magnet chamber. In this case the pilot chamber can also be integrated into the pressurizing medium circulation across the channel. It has been found that in this implementation controlled opening and closing can be attained and the natural vibration tendency of the vibration damper can as well also be reduced.

In a different further development the tappet is implemented in the form of a cylinder and has a first diameter, wherein the closure element has a second diameter differing from the first diameter. The channel of the tappet opens out at the first end into the pilot chamber, and at the second end of the tappet is connected with the further aperture, wherein the size of the aperture, across which the pilot chamber is in connection with the high pressure chamber, and the size of the further aperture are adapted to the first diameter and to the second diameter. In this further development the controlled opening and closing behaviour can also be attained and the natural vibration tendency of the vibration damper can be reduced.

BRIEF DESCRIPTION OF THE DRAWING

The controllable vibration damper according to the application will be described further detail in the following in connection with several embodiment examples with reference to Figures. Therein depict.

Unless otherwise specified, in the following Figures identical reference symbols denote identical parts with identical significance.

DETAILED DESCRIPTION

Figure 1:
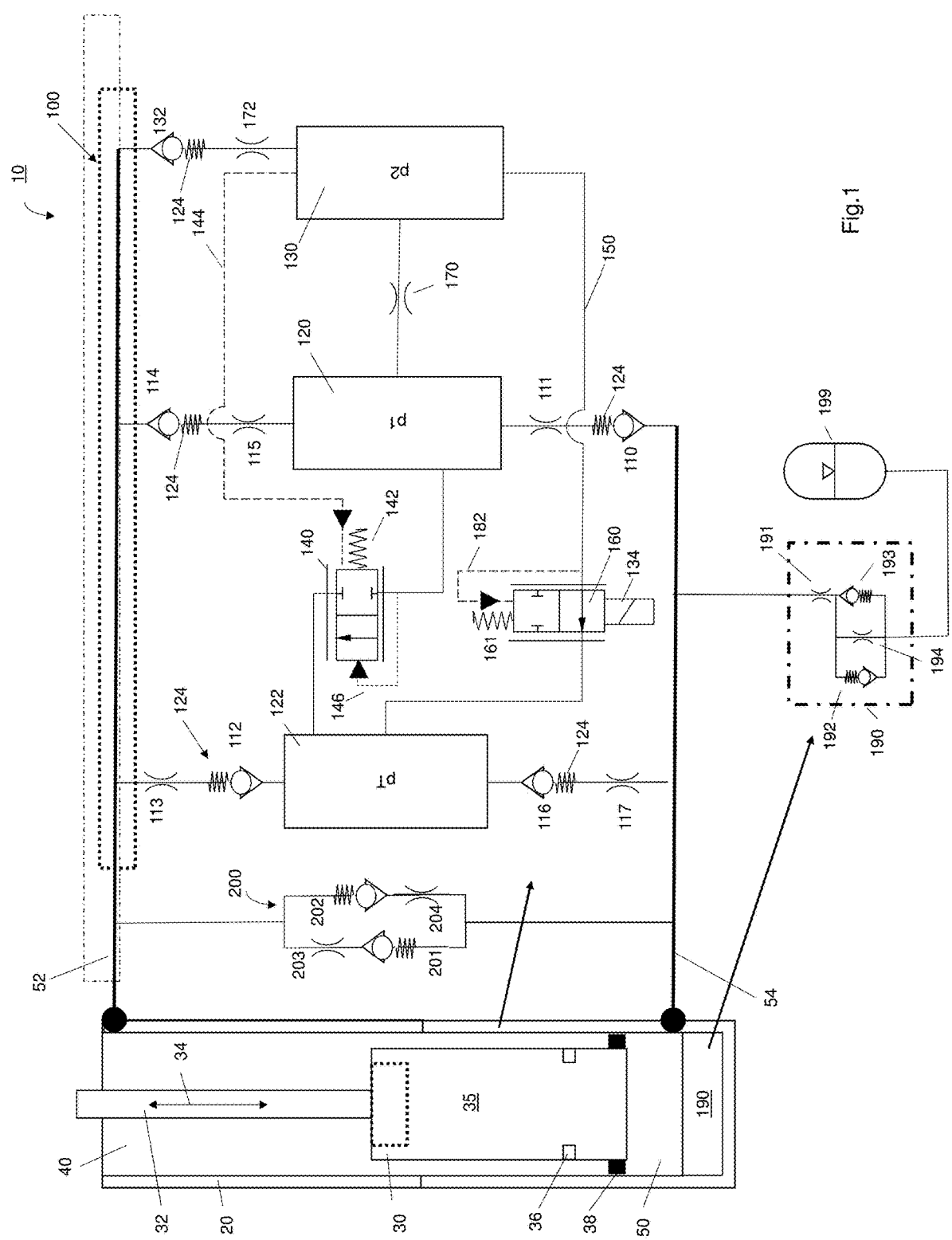
FIG. 1 a schematic structure of a controllable vibration damper with a valve device for the damping force control according to a first embodiment example, FIG. 2 a damping force volume flow diagram with damping characteristics for the compression volume as an explanation of the effect of the pilot valve and the apertures of the valve device, FIG. 3 a damping force volume flow diagram similar to that of FIG. 2, however for the rebound volume, FIG. 4 a second embodiment example of a valve device of a controllable vibration damper, FIG. 5 a third embodiment example of a controllable vibration damper, FIG. 6 a fourth embodiment example of the controllable vibration damper, FIG. 7 a fifth embodiment example of the controllable vibration damper, FIG. 8 a basic representation of an embodiment example of a pilot valve in compression mode, FIG. 9 the embodiment depicted in FIG. 8 of the pilot valve in rebound mode, FIG. 10 a sixth embodiment example of the controllable vibration damper, FIG. 11 a basic representation of a further embodiment example of a pilot valve in compression, FIG. 12 a graphic representation of the pressure conditions obtaining in the pilot valve as a function of the main volume flow through the pilot valve in rebound mode at unsuitable aperture selection, FIG. 13 a graphic representation of the pressure conditions obtaining in the pilot valve as a function of the main volume flow through the pilot valve in rebound mode at suitable selection of the aperture, FIG. 14 a graphic representation of the pressure conditions obtaining in the pilot valve as a function of the main volume flow through the pilot valve during compression mode at unsuitable aperture selection, and FIG. 15 a graphic representation of the pressure conditions obtaining in the pilot valve as a function of the main volume flow through the pilot valve in compression mode at suitable aperture selection.

FIG. 1 shows an embodiment example of a controllable vibration damper with reference to its schematic structure. The vibration damper which, for example, is mounted on the wheel suspension of a wheel of a motor vehicle to set the damping of the wheel suspension and therewith the damping of the motor vehicle during driving, is denoted by the reference symbol 10. The vibration damper 10 comprises a damper tube which is denoted in the following as operating cylinder 20. In this operating cylinder 20 a piston 30 secured on a piston rod 32 is movable back and forth. The piston 30 is herein coupled with the wheel suspension of the motor vehicle. The back and forth movement of piston 30 is marked by a motion arrow 34 in FIG. 1. As is evident, the piston 30 can move downwardly in the operating cylinder 20 and another time upwardly during its movement back and forth. In the following, the downward movement of the piston 30 is discussed as a pressing (compression) of the piston 30 and the upward movement is discussed as a pulling (tension) of the piston. Accordingly, beneath the piston 30 is located an operating volume 50, denoted as "compression volume" and a second operating volume 40 is located above the piston 30. This second operating volume is provided with the reference symbol 40 and denoted as "rebound volume".

The upper operating volume 40 (rebound volume) and the lower operating volume 50 (compression volume) are each provided with a pressurizing medium line 52, 54. Connected to these two pressurizing medium lines 52, 54 is a valve device 100 which in the following will be discussed in detail. For reasons of simpler representation feasibility, the valve device 100 is depicted as a valve device disposed outside of the operating cylinder 20. However, this is only done for reasons of representation. The overall valve device 100 is rather seated within the pot-shaped piston 30 of the vibration damper. The piston 30 comprises for this purpose bores 36, shown only schematically in FIG. 1, across which the installation volume 35 within the piston 30 is hydraulically connected with the upper operating volume 40 (rebound volume). In addition, the upper operating volume 40 (rebound volume) and the lower operating volume 50 (compression volume) are sealed at the outer circumference of the piston 30 via a radial seal 38. The front face of piston 30 is therefore in hydraulic connection across a suitable opening with the lower operating volume 50 (compression volume).

The valve device 100 connected to the two pressurizing medium lines 52, 54 comprises a bridge circuit with four check valves 110, 112, 114, 116. These check valves 110, 112, 114, 116 are connected crosswise in the forward direction, wherein the connection of a first bridge section frames a high pressure chamber 120 with the two oppositely connected check valves 110, 114 and the connection of a second bridge section with the two further opposite check valves 112, 116 leads to a low pressure chamber 122. As is clearly shown in FIG. 1, the first check valve 110 and the fourth check valve 116 are connected to the lower pressurizing medium line 54 and are therefore in connection with the lower operating volume 50 (compression volume). The first check valve 110 is connected in the forward direction to the lower operating volume 50 (compression volume). The fourth check valve 116, in contrast, is connected in the reverse direction to the lower operating volume 50. The second check valve 112 and the third check valve 114, in contrast, are in connection with the upper pressurizing medium line 52. The second check valve 112 is herein connected in the reverse direction to the upper operating volume 40 (rebound volume) and the third check valve 114 is connected in the forward direction.

As the representation in FIG. 1 further shows, in series with the four check valves 110, 112, 114, 116 are arranged in each instance apertures 111, 113, 115, 117. The first aperture 111 is located between the first check valve 110 and the high pressure chamber 120. The second aperture 113 is located between the pressurizing medium line 52 and the second check valve 112. The third aperture 115 is located between the high pressure chamber 120 and the third check valve 114. Lastly, the fourth aperture 117 is located between the pressurizing medium line 54 and the fourth check valve 116. The four check valves 110, 112, 114, 116 of the bridge circuit are preferably provided with settable spring elements. Hereby the opening behaviour of the discrete check valves 110, 112, 114, 116 can be selected having been preset depending on the layout of the spring force of the settable spring elements.

The valve device 100 comprises additionally a main slide-gate 140, a controllable pilot valve 160, preferably a power-controlled electromagnetic (solenoid) pilot valve 160 with a magnet 134, implemented in particular as electromagnet, as well as a pilot pressure chamber or pilot chamber 130. The pilot chamber 130 is connected to the upper pressurizing medium line 52 across a fifth check valve 132. Like the third check valve 114, this fifth check valve 132 is located in the forward direction toward the upper operating volume 40 (rebound volume). The pilot chamber 130 is in hydraulic connection with the high pressure chamber 120 across a fifth aperture 170. A sixth aperture 172 is connected between the fifth check valve 132 and the pilot chamber 130.

The already cited pilot valve 160 is connected between the low pressure chamber 122 and the pilot chamber 130 across a line 150. In the present case, the pilot valve 160 is laid out as a power-controlled electromagnetic (solenoid) 2/2 valve which operates proportionately. This means that, depending on the energization of electromagnet 134 of the pilot valve 160, a greater or lesser through-flow can obtain between the low pressure chamber 122 and the pilot chamber 130 through the line 150. The pilot valve 160 operates against a spring device 161 and against a pressure exerted from the pilot chamber 130. This is indicated in FIG. 1 by control line 182.

The main slide-gate 140, also already cited, is also a 2/2 valve, however a valve operating exclusively hydraulically. This main slide-gate 140 connects the low pressure chamber 122 with the high pressure chamber 120. The main slide-gate 140 operates, for one, against a spring device 142 and, against a pressure of the pilot chamber 130 arriving across the control line 144. The main slide-gate 140 is otherwise affected on its opposite side by a control line 146 coming from the high pressure chamber 120.

For the sake of completeness, it should also be mentioned that the controllable vibration damper depicted in FIG. 1 comprises additionally a base valve 190 in the bottom of the operating cylinder 20. This base valve 190 is known per se in vibration dampers and is connected between the lower pressurizing medium line 54 and a tank 199. The base valve 190 comprises for this purpose, for example, an aperture 191 between the lower pressurizing medium line 54 and the tank 199, which aperture is in connection with the lower pressurizing medium line 54. Placed on this aperture 191 are, on the side facing away from the pressurizing medium line 54, two antiparallel-connected check valves 192, 193, wherein additionally a further aperture 194 is connected in parallel.

Lastly, between the two pressurizing medium lines 52, 54 a so-called blow-off valve 200, also known per se, is connected. This blow-off valve 200 serves for the purpose of setting a maximally attainable damping force on the vibration damper. As shown, for this purpose the blow-off valve 200 is, for example, comprised of two antiparallel-connected check valves 201, 202, upstream of each of which an aperture 203, 204 is connected.

The mode of action of the controllable vibration damper of FIG. 1 is the following.

It is firstly assumed that the piston 30 moves upwardly and the operating volume 40 (rebound volume) becomes thereby smaller. This operating mode is denoted in the following as rebound mode. The pressure in the operating volume 40 (rebound volume) hereby increases with continuing movement of piston 30. The pressure in the pressurizing medium line 52 increases. The second check valve 112 is in reverse direction such that this pressure cannot reach the low pressure chamber 122. However, the third check valve 114 is connected in the forward direction such that, in overcoming the spring force of the settable spring element 124 of the check valve 114, it opens and the pressure of the pressurizing medium line 52 is available in the high pressure chamber 120. The fifth check valve 132, additionally, is in forward direction toward the pilot chamber 130. Due to the connection between the high pressure chamber 120 and the pilot chamber 130, a certain pressure develops in the pilot chamber 130 across apertures 170, 172, wherein the pressure arriving across the pilot valve 160 from the low pressure chamber 122 is available as counterpressure. Via suitable energization of the electromagnet 134, the pilot valve 160 can be controlled such that the pressure building up lastly in the pilot chamber 130 sets up as a function of the energization of the pilot valve 160. This pressure acting in the pilot chamber 130 is supplied across the control line 144 to the main slide-gate 140 such that the pressure in the pilot chamber 130 also co-affects the position of the main slide-gate 140. Through the appropriate energization of the pilot valve 160 the damper characteristic of the vibration damper under tensile loading of piston 30 can be set.

If the opposite movement of piston 30 is considered, thus in the direction downwardly (compression mode), the pressure in the lower pressurizing medium line 54 increases. In this case the fourth check valve 116 is in its reverse position and the first check valve 110 to the high pressure chamber 120 in forward direction. In this case the high pressure chamber 120 is in connection with the pilot chamber 130 across the aperture 170 and a mechanism of action similar as above in the compressive loading sets up.

In FIGS. 2 and 3 the force-/volume flow-characteristics are depicted in tensile- or compressive loading, (rebound mode or compression mode respectively) of the piston 30 in the operating cylinder 20 as a function of energization of the pilot valve 160. FIG. 2 shows the characteristic under compressive loading and FIG. 3 that under tensile loading. The controllable pilot valve 160 is implemented in the present embodiment as a so-called normally-open valve. This means that in the absence of energization of the electromagnet 134, this pilot valve 160 is open. In this case, the low pressure chamber 122 is in connection with the pilot chamber 130 without restriction (unthrottled). The hydraulic force conducted across the control line 144 to the main slide-gate 140 is therefore minimal, whereby under tensile loading a minimal damping characteristic sets up. This minimal damping characteristic under tensile loading is the lowest characteristic in FIG. 2. If, in contrast, the controlled pilot valve 160 is under maximal energization, the pilot valve 160 is nearly closed, and a maximal pressure onto the main slide-gate 140 across the control line 144 is reached. The result, in FIG. 2 for the compressive loading, is the upper curve profile with the maximal value maxi. By varying the energization, the different characteristic profiles can be set.

The same applies for the depiction in FIG. 3 under tensile loading. The lowest curve shows a weakest damping characteristic under tensile loading. If, in contrast, the pilot valve 160 is maximally energized, for example with 1.6 A, the upper damping profile occurs (cf. max2).

Comparison of the two curves in FIG. 2 and FIG. 3 shows that the maximal damping values of the two characteristics are different. This is attained by a suitable aperture selection of apertures 170 and 172 of the valve device 100.

Figure 4:
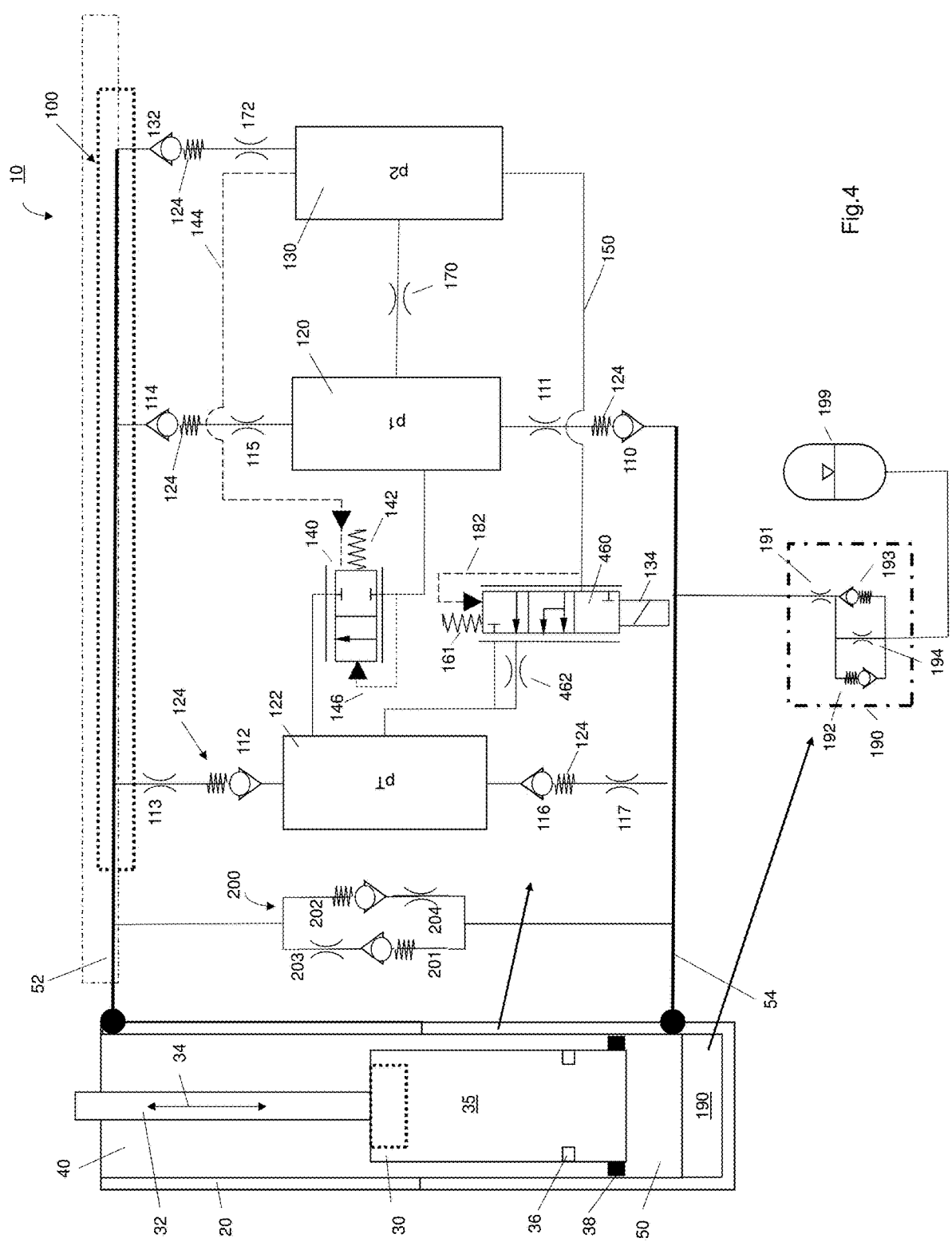

FIG. 4 shows a second embodiment example of a controllable vibration damper 10 which to a large extent is structured similarly to the vibration damper of FIG. 1. In the following only the differences from the embodiment of FIG. 1 will be elucidated.

The vibration damper of FIG. 4 differs in the implementation of the pilot valve and in its flow circuitry. The pilot valve is here denoted by the reference symbol 460. This pilot valve 460 is in this case again power-controlled and therefore comprises again an electromagnet 134. The pilot valve 460 is laid out as a 3/3 valve operating proportionately, as indicated by the circuit symbol in FIG. 4. Between the low pressure chamber 122 and the pilot valve 460 the line 150 divides into two connection lines. One of these connection lines comprises an aperture 462, while the parallel further connection line does not include any further structural parts. As in the embodiment example of FIG. 1, this pilot valve 460 also works against a spring device 161 and against a pressure originating from the pilot chamber 130, which is directed across the control line 182 parallel to the spring force of the spring device 161, against which the pilot valve 460 works. The aperture 462 has the purpose of setting in the event of power failure a middle damper characteristic, thus a middle characteristic (cf. FIG. 2 and FIG. 3). The middle characteristic is here shown in dashed lines.

Figure 5:
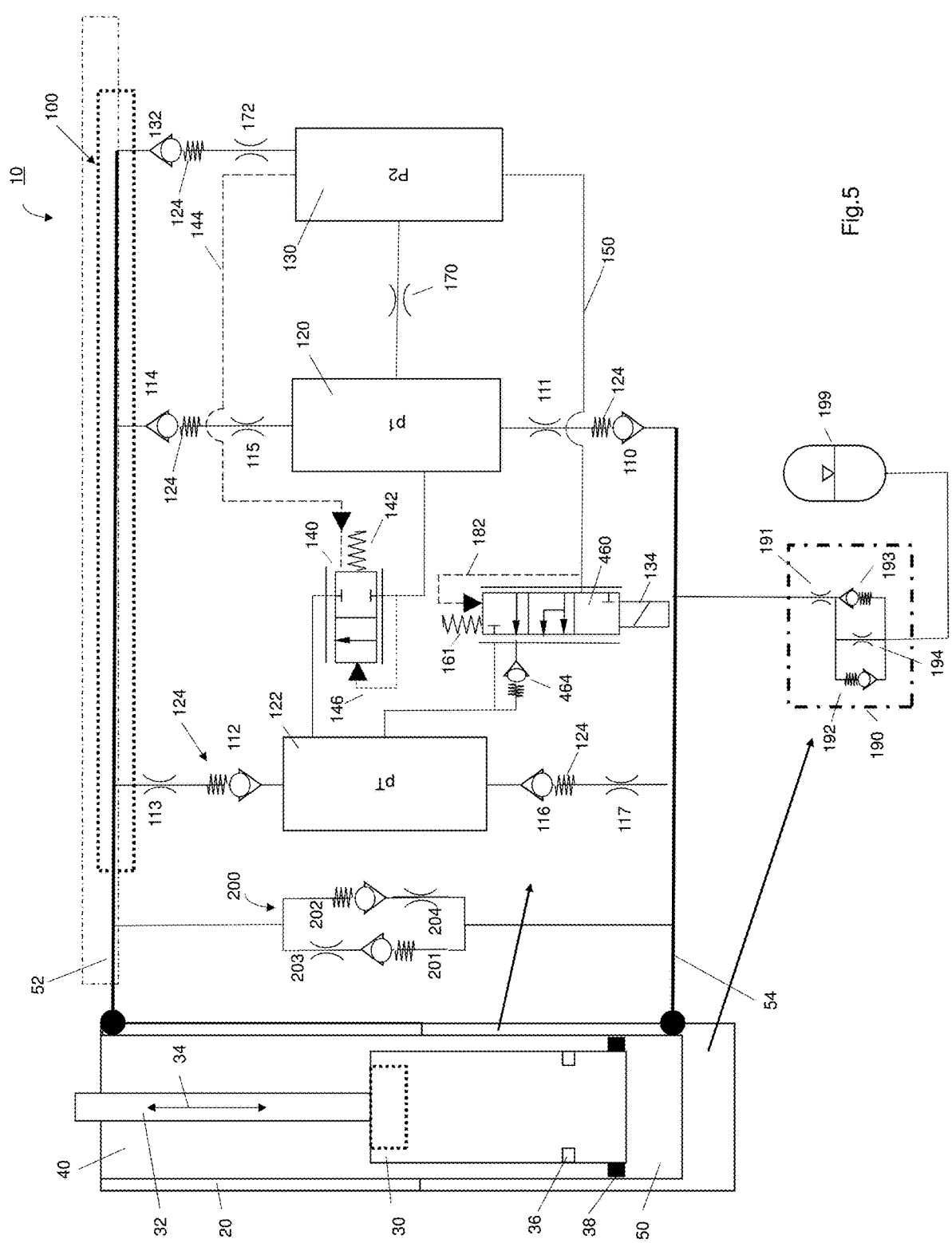

FIG. 5 shows a further variant (third embodiment example) of the controllable vibration damper. Instead of the aperture 462 provided in FIG. 4, the pilot valve 460 now comprises a further check valve 464. Hereby better Failsafe characteristics can be generated.

Figure 6:
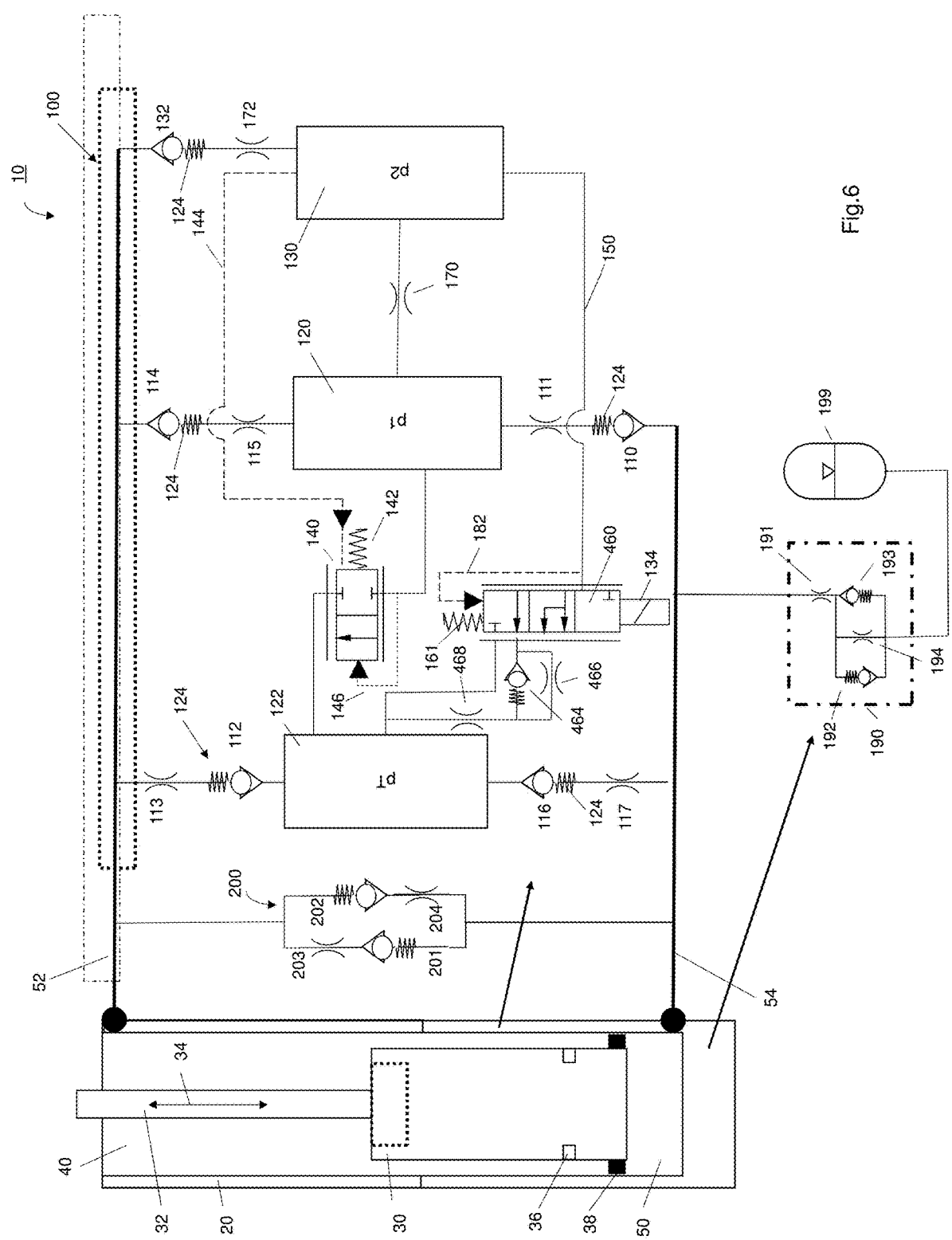

Furthermore, FIG. 6 shows a fourth embodiment example in which the pilot valve 460 discussed already in connection with FIGS. 4 and 5 is employed. However, connected in parallel with the check valve 464 depicted in FIG. 5 is now a further aperture 466 and a further aperture 468 is interconnected between the check valve 466 and the low pressure chamber 122. The latter aperture 468 serves here as damping aperture.

Figure 7:
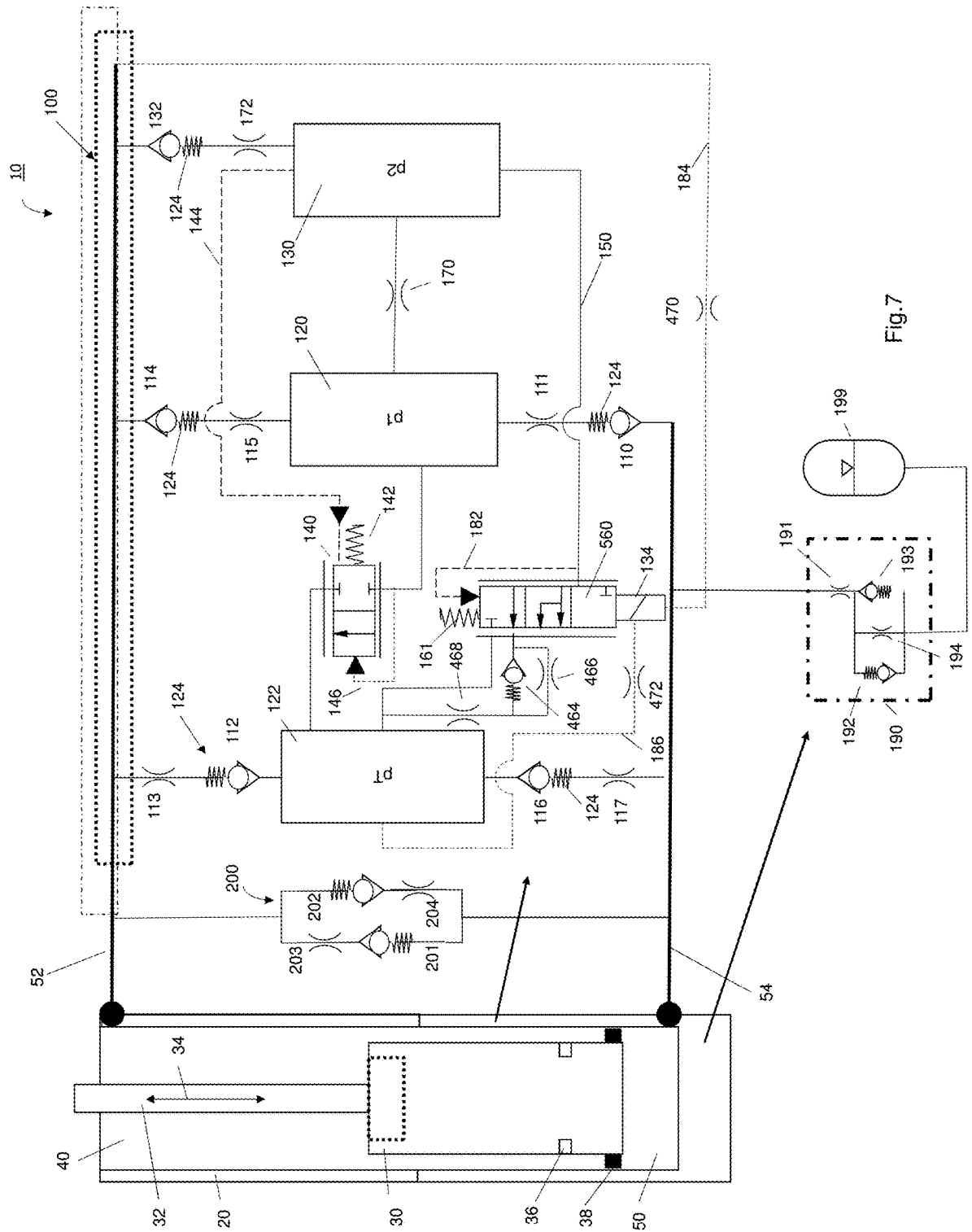

In FIG. 7 is shown a fifth embodiment example of the controllable vibration damper 10, which largely resembles the fourth embodiment example. The vibration damper 10 according to the fifth embodiment example comprises, in particular, a differently structured pilot valve 560, in which the electromagnet 134 is implemented so as to enable through-flow of pressurizing medium. For this purpose a control line 184 originates from the pressurizing medium line 52 and opens out into the electromagnet 134. In the control line 184 is disposed an aperture 470 with which the pressure introduced across the control line 184 into the electromagnet 134 can be set.

Furthermore, a further control line 186 extends between the electromagnet 134 and the low pressure chamber 122. In the control line 186 an aperture 472 is disposed.

Figure 8:
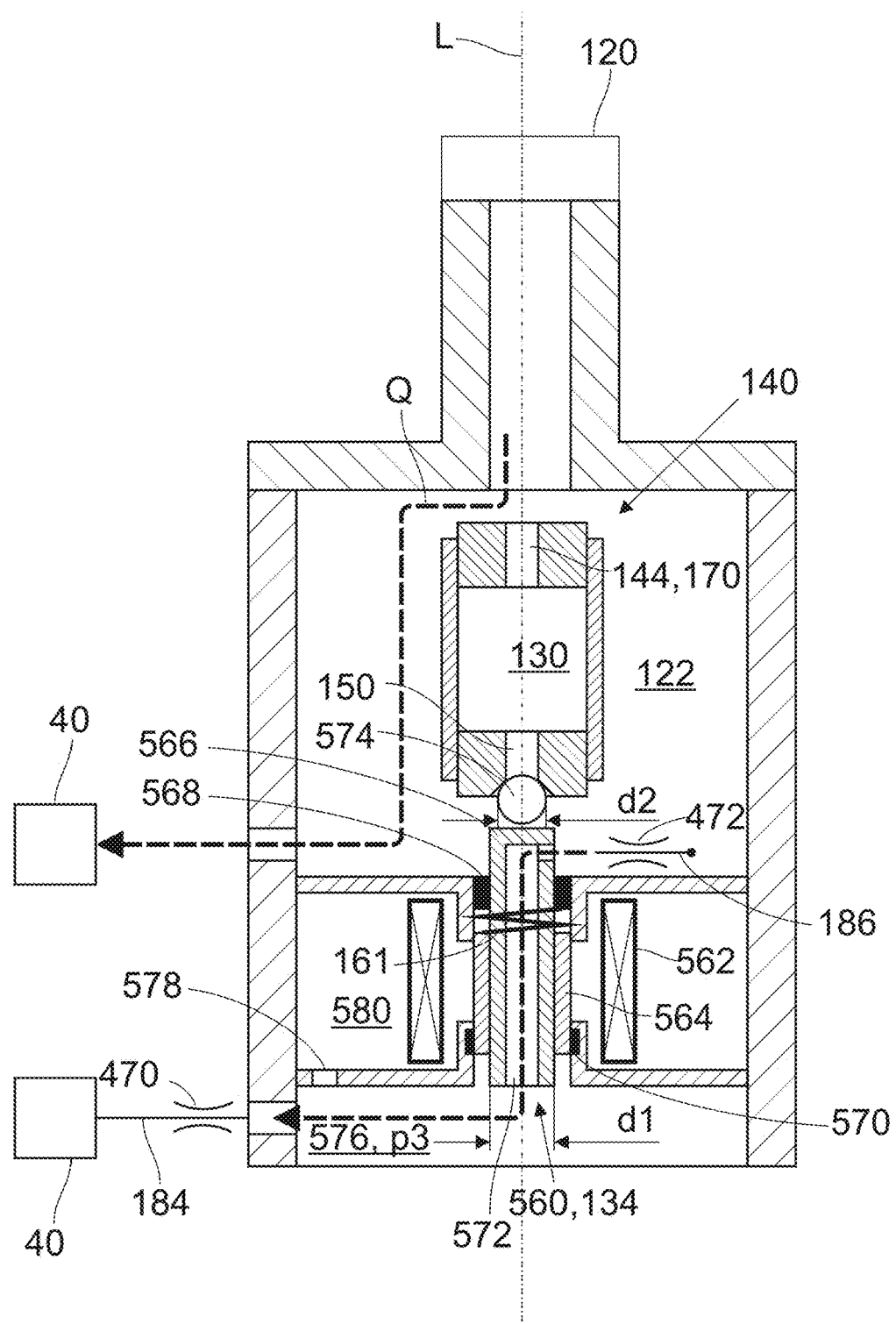
Figure 9:
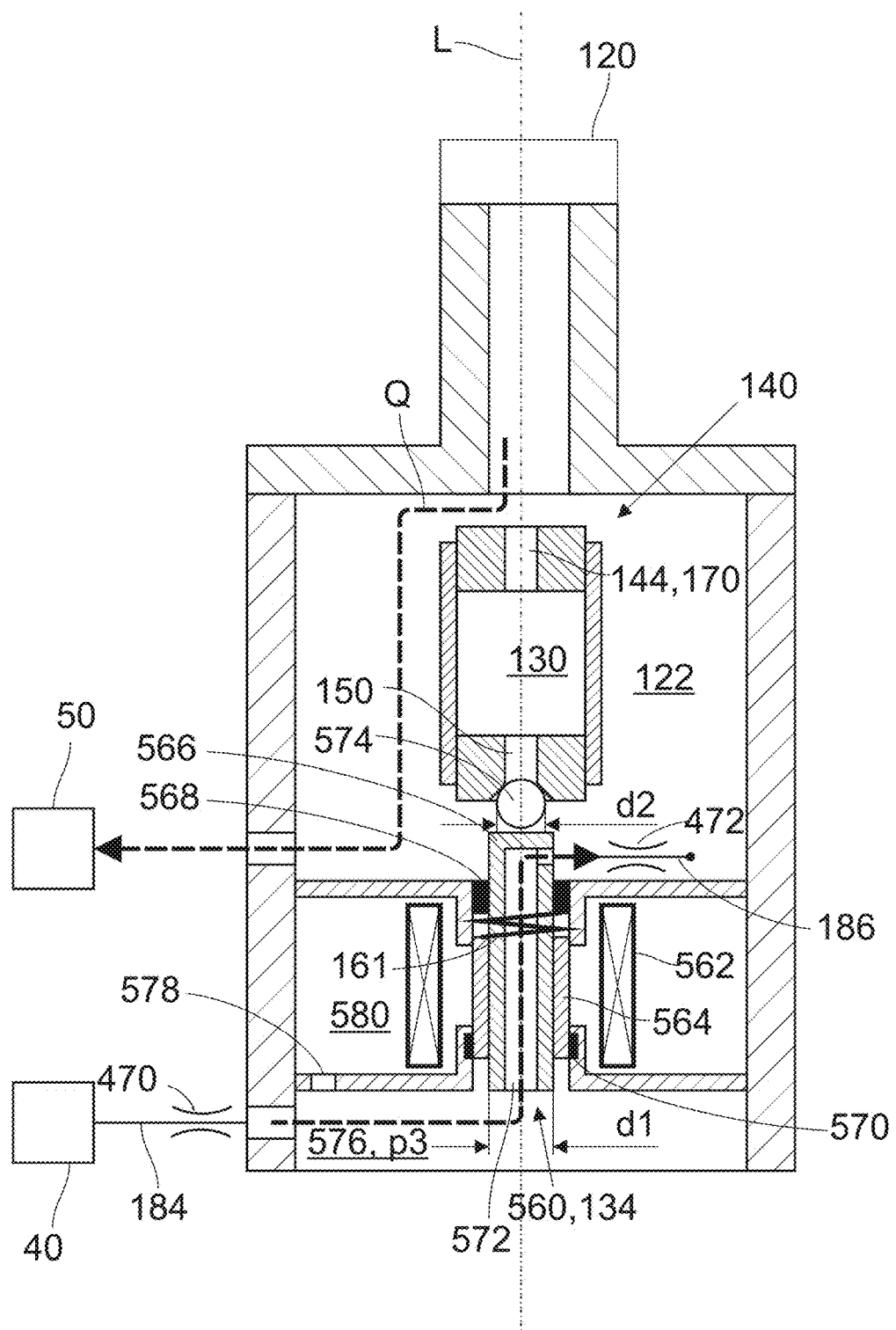

In FIGS. 8 and 9 the structure of the pilot valve 560 is shown in detail in a schematic diagram. The pilot valve 560 comprises an energizable coil 562 with which an armature 564 is movable along a longitudinal axis L of the pilot valve 560. Fixedly connected with the armature 564 is a tappet (rod) 566, sometimes also denoted as axle, such that the tappet 566 executes the same movements as the armature 564. In order for the armature 564 and the tappet 566 to be able to move along the longitudinal axis L, a first bearing 568 and a second bearing 570 are provided which can be implemented, for example, as slide bearings. In order to establish a fluidic connection between the control line 184 and the control line 186, the tappet 566 comprises a channel 572. The first bearing 568 and the second bearing 570 can also be implemented such that they can establish a fluidic connection between the control line 184 and the control line 186. The tappet 566 cooperates with a closure element 574 that is a part of the main slide-gate 140. With the closure element 574 the line 150 between the pilot chamber 130 and the low pressure chamber 122 can be opened and closed. In the depicted example the closure element 574 is implemented to be spherical. Tappet 566 is implemented such that an end directed toward closure element 574 is located in the low pressure chamber 122 while its end directed away from the closure element 574 is disposed in a magnet chamber 576. The consequence is that different pressures, namely pressure pT of the low pressure chamber 122 and pressure p3 of the magnet chamber 576, act onto the tappet 566, which will be discussed in detail in the following. The magnet chamber 576 is connected across a throughlet opening 578 with a coil volume 580 encompassing the coils 562 such that the same pressure obtains in the coil volume 580 and in the magnet chamber 576.

Tappet 566 has a diameter d1 and the spherical closure element 574 a diameter d2. For example, the diameter d1 can be 3 or 4 mm and the diameter d2 can be 2.3 mm. Diameter d1 is in every case greater than diameter d2. Furthermore, the diameter of aperture 470 is less than the diameter of aperture 472.

Independently of whether the vibration damper 10 is in compression or in rebound mode, a main volume flow Q becomes established from the high pressure chamber 120 through the low pressure chamber 122, if the main slide-gate 140 is opened. In compression mode the pressurizing medium flows from the low pressure chamber 122 to the rebound volume 40 and in rebound mode to the compression volume 50 (cf. FIGS. 8 and 9).

As already explained, the diameter of aperture 470 is less than the diameter of aperture 472. In the compression mode depicted in FIG. 8 the pressurizing medium flows, moreover, from the low pressure chamber 122 through the control line 186 and the aperture 472 into channel 560 and subsequently into the magnet chamber 576 and from here through the control line 184 and the aperture 470 into the rebound volume 40.

In rebound mode depicted in FIG. 9 the pressurizing medium flows from the rebound volume 40 through the control line 184 and aperture 470 into the magnet chamber 576, and from here through channel 560 and through the control line 186 and aperture 472 into the low pressure chamber 122. From there the pressurizing medium flows into the compression volume 50 as has been described for the main volume flow Q.

In compression mode closing forces are exerted onto the tappet 560 since, due to the fact that aperture 472 has the greater diameter in comparison to aperture 470, the dynamic pressure in the magnet chamber 576 increases. The opening force acting onto the annular face of the tappet 470 directed toward the closure element 574 is more than compensated, and the tappet 470 opens through the minimal hydraulic clamping under greater control over the main volume flow Q. The magnet force to be applied by the coils 562 can therefore be lower, which improves the energy efficiency of the controlled vibration damper 10.

In rebound mode the flow through channel 572 is in the reverse direction. Here also closing forces onto tappet 560 are produced since pressure p1 of the high pressure chamber 120 would also be present in the magnet chamber 576 and, consequently, would be equal to pressure p3 if the pressurizing medium would not have to flow through the aperture 470. Without aperture 470 the closing force would be very high and there would be the risk that the pilot valve 560 would not open at all. Through the suitable selection of the size of the aperture 470, pressure p3 can be set such that the closing force has the desired value.

With increasing main volume flow Q, the low pressure as well as also the pressure p3 in the magnet chamber 576 increase whereby the pilot valve 560 automatically stabilizes.

Figure 10:
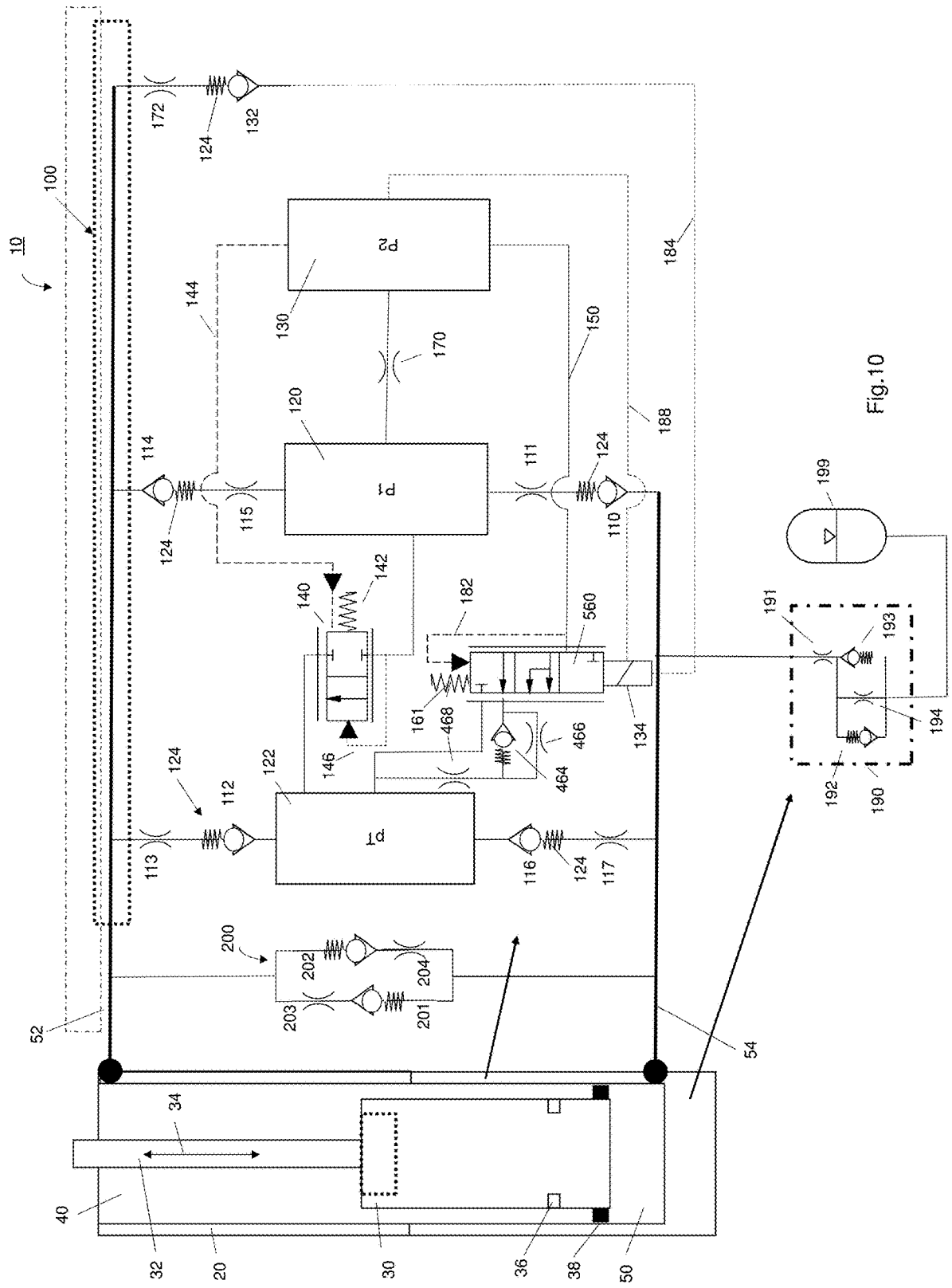

FIG. 10 shows a sixth embodiment example of the controllable vibration damper 10 in which the vibration damper, as is also the case in the fifth embodiment example, comprises the pilot valve 560 through which there can be flow. In this embodiment example, the control line 184 also branches off from the pressurizing medium line 52 and opens out into the electromagnet 134. However, in this embodiment example the fifth check valve 132 is not disposed between the upper operating volume 40 and the pilot chamber 130 but rather between the upper operating volume 40 and the electromagnet 134 in the control line 184. The control line 184 comprises furthermore the further aperture 172 between the upper operating volume 40 and the fifth check valve 132.

In addition, a further control line 188 extends between the electromagnet 134 and the pilot chamber 130.

Figure 11:
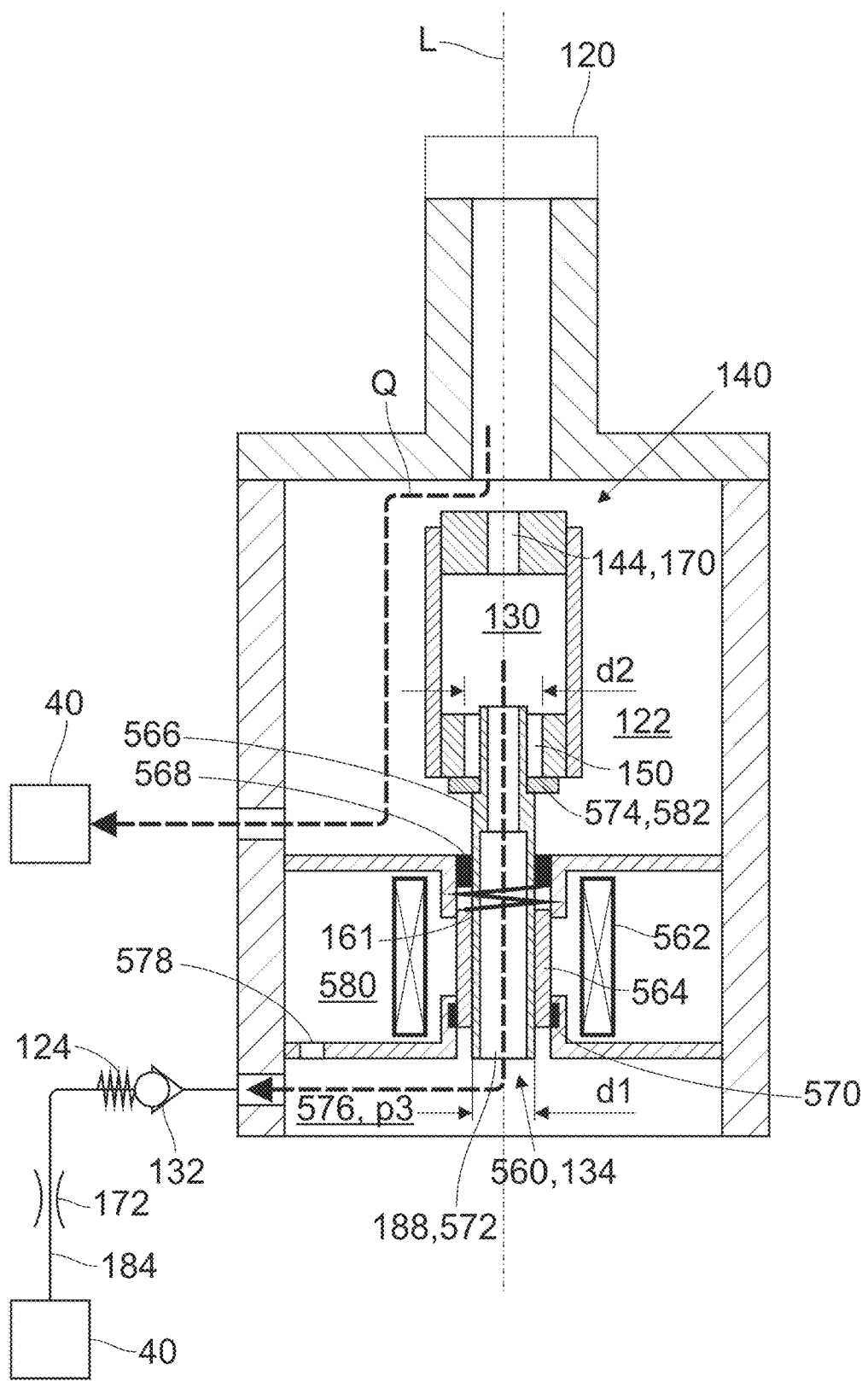

In FIG. 11 the structure of the pilot valve 560 is depicted in detail in a basic diagram. In the following only the differences between the pilot valve shown in FIGS. 8 and 9 and the pilot valve 560 shown in FIG. 11 will be elucidated. The closure element 574 in this embodiment example is not spherical, but rather comprises a sealing disk 582 that is connected with the tappet 566. In this case the line 150 defines the effective diameter d2. With the sealing disk 582 the line 150, and consequently the connection established across it between the pilot chamber 130 and the low pressure chamber 122, can be opened and closed with the appropriate energization of coil 562. The further control line 188 is formed by channel 572.

Independently of whether or not the vibration damper 10 is in compression mode or in rebound mode, a main volume flow Q from the high pressure chamber 120 through the low pressure chamber 122 is produced if the main slide-gate 140 is opened. The pressurizing medium flows in compression mode from the low pressure chamber 122 further to the rebound volume 40 and in rebound mode to the compression volume 50.

In FIG. 11 is depicted the pilot valve 560 in compression mode. The pressurizing medium herein flows in addition from the high pressure chamber 120 through the aperture 170 into the pilot chamber 130 and through channel 572, that forms the control line 188, and through the control line 184 and aperture 172 into the rebound volume 40 if the pressure of the pressurizing medium is high enough to open the check valve 132. The pressure of the pressurizing medium in the control line 184 can be affected with the aperture 170.

In the not depicted rebound mode the pressurizing medium flows from the rebound volume 40 through the control line 184 and aperture 172 where the pressure is decreased. The check valve 132 stops the further flow of the pressurizing medium through line 184. In this embodiment example through the suitable selection of the size of the aperture 170 and the further aperture 172 the pressure p3 can also be set such that the closing forces acting onto the tappet 566 have the desired value.

In FIGS. 12 to 15 the pressure pT building up in the low pressure chamber 122 and pressure p3 in the magnet chamber 576 are shown as a function of the main volume flow Q, each for a suitable and an unsuitable selection of apertures 470 and 472 in rebound and in compression mode.

Figure 12:
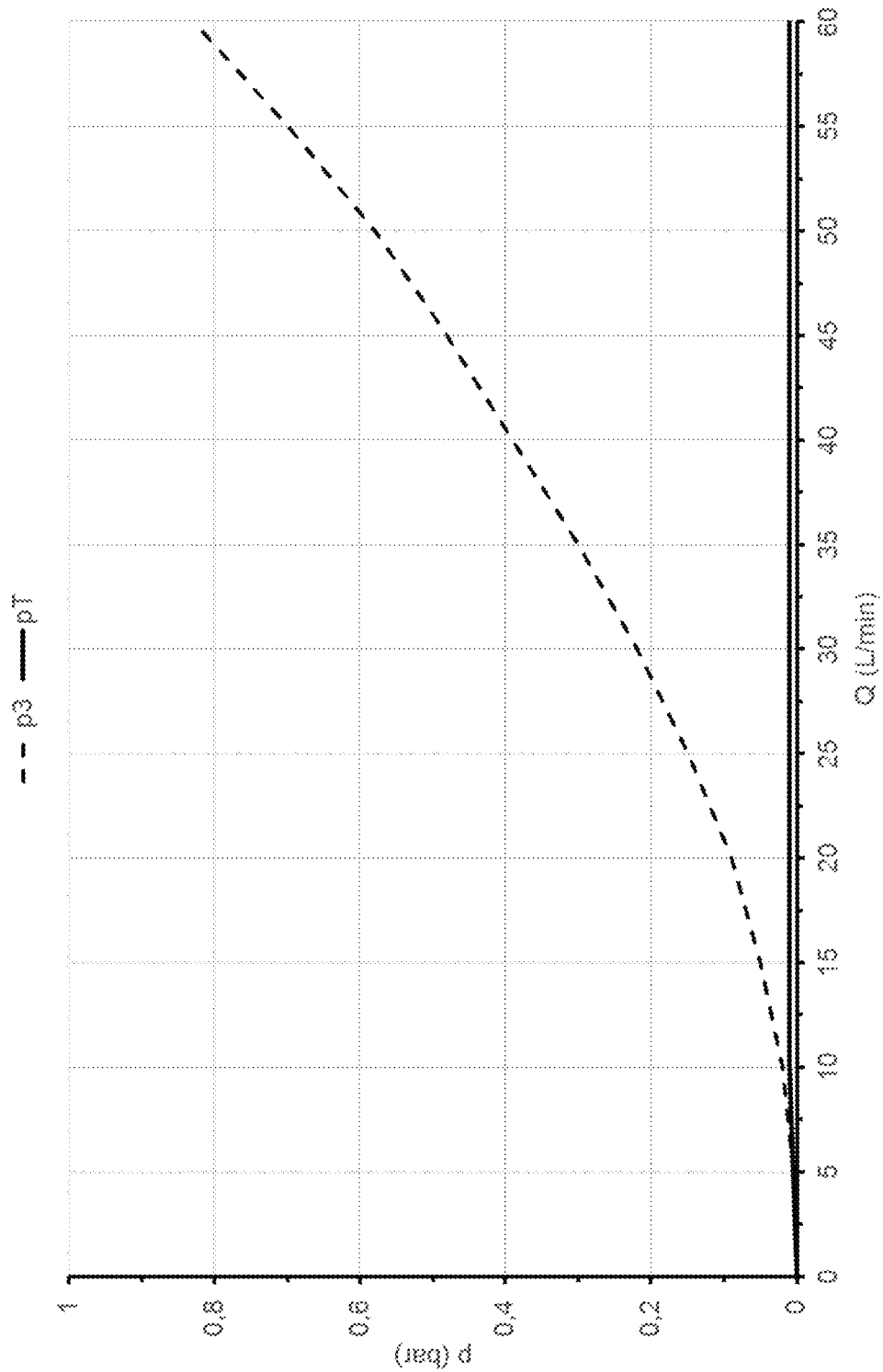

In FIG. 12 is shown an example of an unsuitable layout of apertures 470 and 472 in rebound mode. It is evident that the pressure p3 in the magnet chamber 576 increases rapidly with increasing main volume flow Q starting at a value of 10 L/min whereby very high closing forces act onto tappet 566. These closing forces can only be compensated by electromagnet 134 to a very limited extent. As a consequence, pilot valve 560 remains closed at least starting at a main volume flow Q of approximately 10 L/min, and pressure pT in the low pressure chamber 122 remains substantially at zero.

Figure 13:
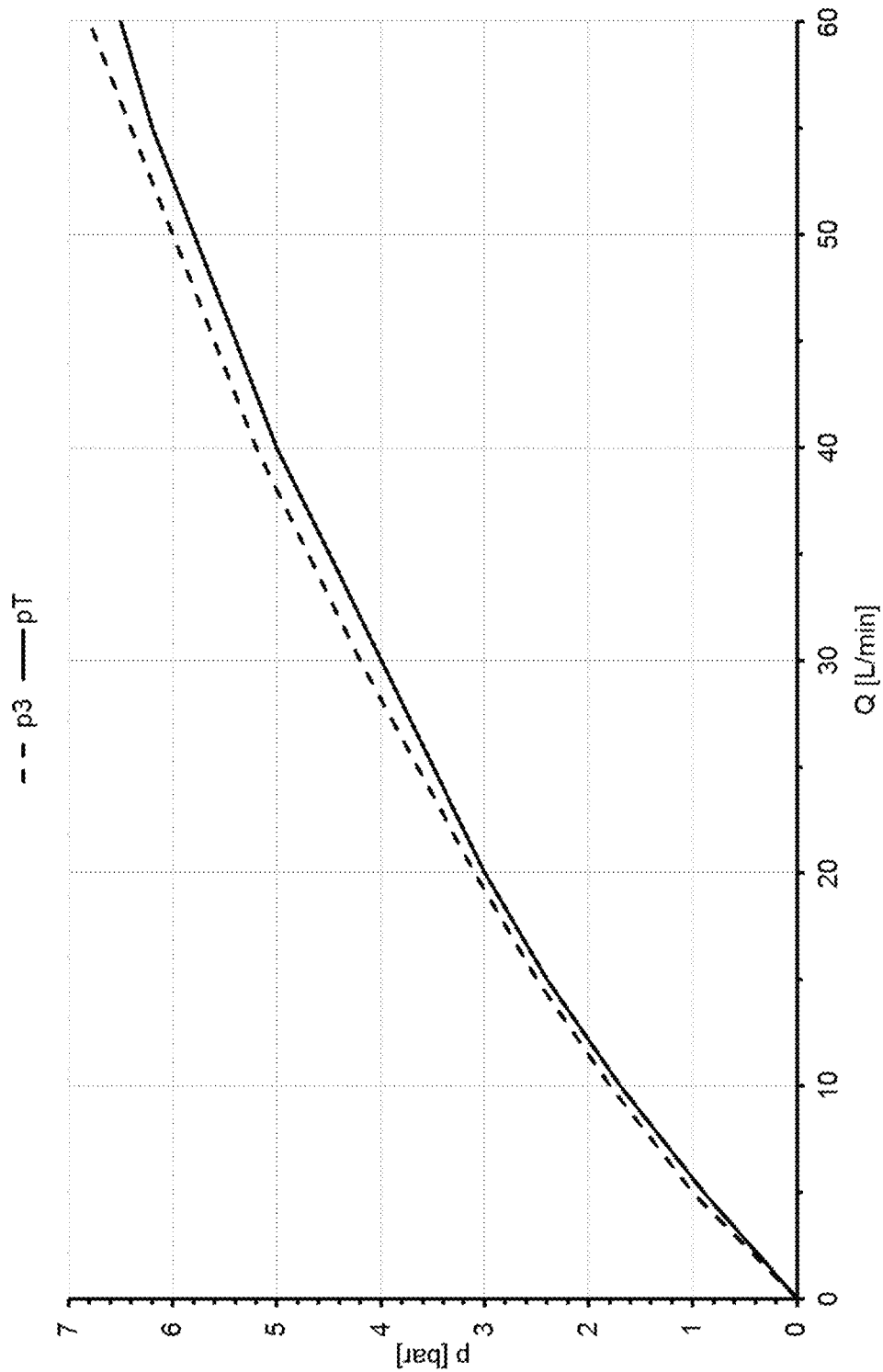

In FIG. 13 an example of a suitable layout of the apertures 470 and 472 is shown in rebound mode. Pressure p3 in the magnet chamber 576 is minimally higher than the pressure pT in the low pressure chamber 122 over the entire depicted main volume flow Q. Hereby is ensured that the pilot valve 560 can be opened under control, independently of the value of the main volume flow Q, with the forces generated by electromagnet 134.

Figure 14:
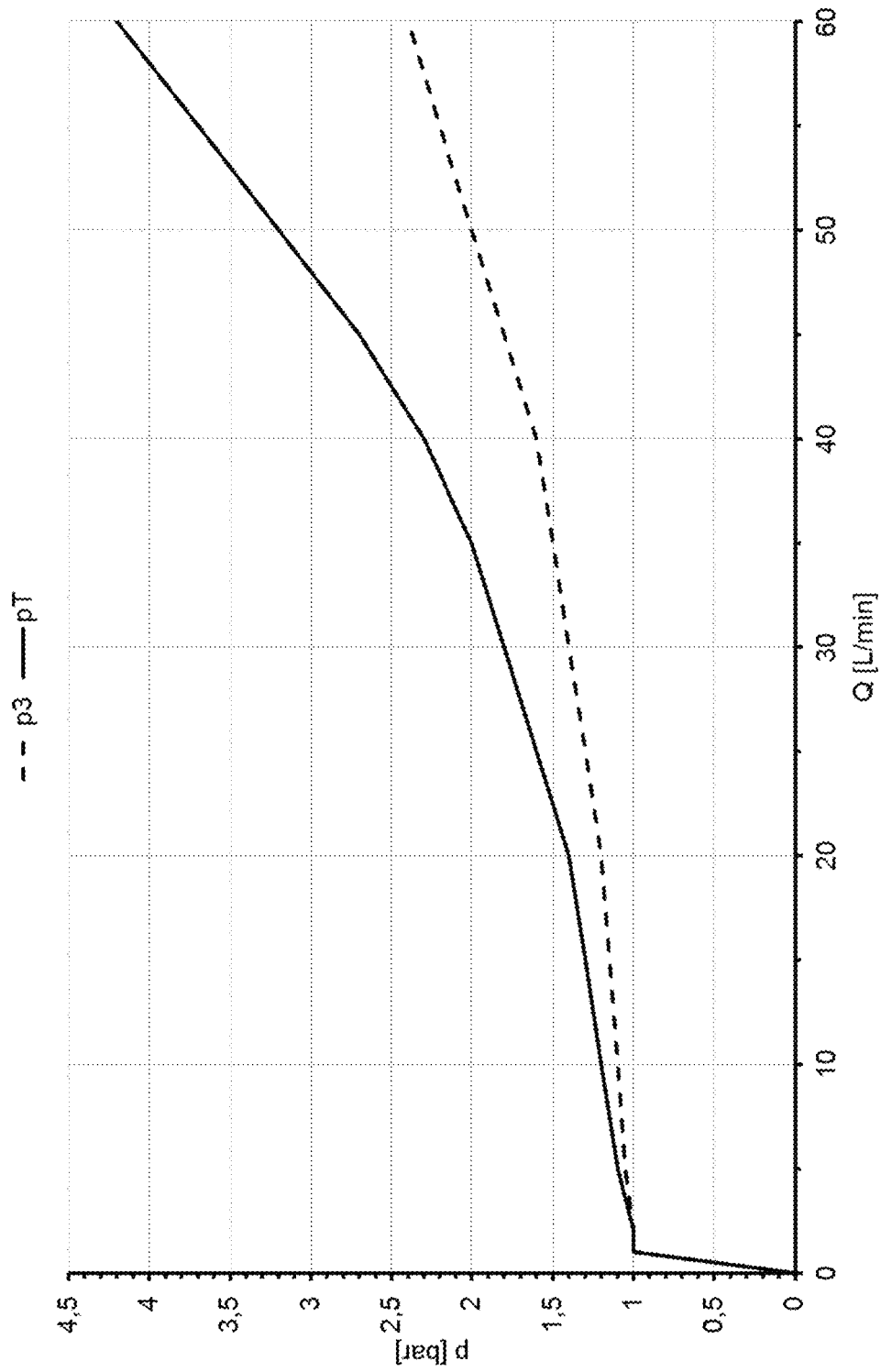

FIG. 14 shows an example of an unsuitable layout of apertures 470 and 472 in compression mode. In comparison with FIGS. 10 and 11, it can be seen that now the pressure p3 in the magnet chamber 576 is lower than pressure pT in the low pressure chamber 120. If apertures 470 and 472 are laid out as shown in FIG. 12, too low a pressure p3 builds up in the magnet chamber 576 such that too low a closing force acts onto tappet 566. Starting at a main volume flow of approximately 5 L/min, the pilot valve 560 opens abruptly if, as shown in FIGS. 8 and 9, the diameter d1 of tappet 566 is greater than the diameter d2 of the closing element 574.

Figure 15:
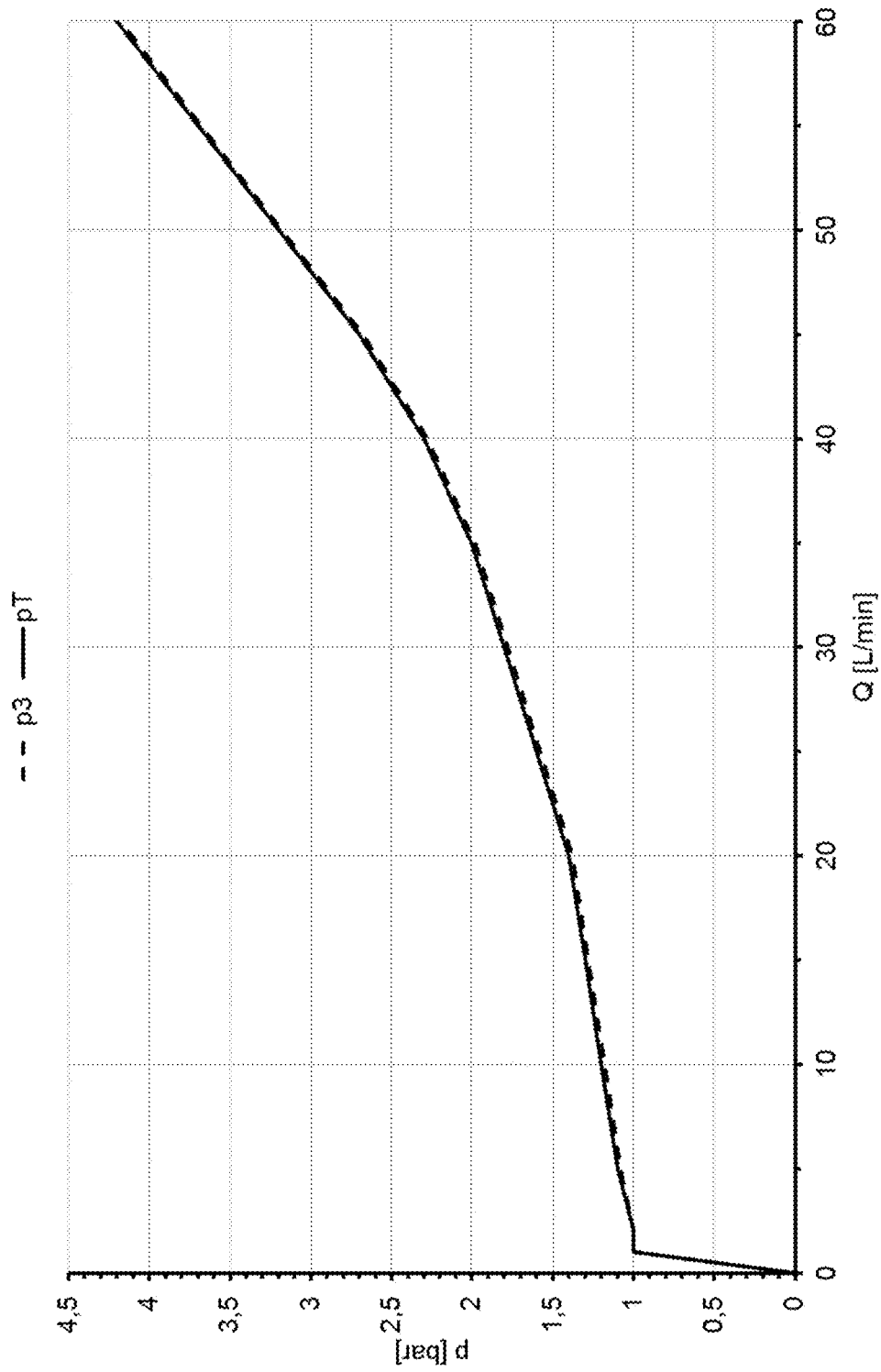

FIG. 15 shows an example of a suitable layout of apertures 470 and 472 in compression mode. Pressure pT in the low pressure chamber 122 is nearly identical to pressure p3 in the magnet chamber 576 over the entire volume flow Q. Hereby the pilot valve 560 can be opened under high control.

If the hydraulic resistance of aperture 170 and of pilot valve 560 is less than the resistance of aperture 470 and aperture 472, the following results:

$$p1>p2>p3>pT.$$

If the hydraulic resistance of aperture 170 and of the pilot valve 560 is greater than the resistance of aperture 470 and of aperture 472, the following results:

$$p1>p3>p2>pT.$$

Since aperture 470 in rebound mode of the vibration damper 10 is in direct fluidic communication with high pressure chamber p1 120, the action of the aperture 172 can hereby additionally be augmented.

LIST OF REFERENCE SYMBOLS

10 Controllable vibration damper
20 Operating cylinder
30 Piston
32 Piston rod
34 Arrow of movement
35 Installation volume
36 Bores
38 Sealing
40 Operating volume (rebound volume)
50 Operating volume (compression volume)
52 Pressurizing medium line
54 Pressurizing medium line
100 Valve device
110 First check valve
111 First aperture
112 Second check valve
113 Second aperture
114 Third check valve
115 Third aperture
116 Fourth check valve
117 Fourth aperture
120 High pressure chamber
122 Low pressure chamber
124 Settable spring element
130 Pilot chamber
132 Fifth check valve
134 Electromagnet
140 Main slide-gate
142 Spring device
144 Control line
146 Control line
150 Line
160 Pilot valve
161 Spring device
170 Fifth aperture
172 Sixth aperture
182 Control line
184 Control line
186 Further control line
188 Further control line
190 Base valve
191 Aperture]
192 Check valve
193 Check valve
194 Aperture
199 Tank
200 Blow-off valve
201 Check valve
202 Check valve
203 Aperture
204 Aperture
460 Pilot valve
462 Aperture
464 Check valve
466 Aperture
468 Aperture
470 Aperture
472 Aperture
560 Pilot valve
562 Coil
564 Armature
566 Tappet
568 First bearing
570 Second bearing
572 Channel
574 Closure element
576 Magnet chamber
578 Throughlet opening
580 Coil volume
582 Sealing disk
d1 Diameter
d2 Diameter
L Longitudinal axis
p1 Pressure
p2 Pressure
p3 Pressure
pT Pressure

The invention claimed is:
1. A controllable vibration damper, comprising:
a piston movable back and forth in an operating cylinder, wherein the piston divides the operating cylinder into an upper operating rebound volume and a lower operating compression volume, wherein both operating volumes are connected across a pressurizing medium line with a valve device, wherein the valve device comprises:
a bridge circuit comprising two high pressure chamber check valves that are oppositely connected and two low pressure check valves that are oppositely connected, wherein a connection of a first bridge section with the two high pressure check valves frames a high pressure chamber, and a connection of a second bridge section with the two low pressure check valves frames a low pressure chamber,
a hydraulic main slide-gate disposed between the low pressure chamber and high pressure chamber, a pilot chamber connected across a fifth check valve with the pressurizing medium line that is associated with the upper operating rebound volume, a controlled pilot valve across which the pilot chamber is in connection with the low pressure chamber, wherein the pilot chamber is in connection with the high pressure chamber across an aperture.

2. The controllable vibration damper as in claim 1, further comprising a further aperture disposed between the fifth check valve and the pilot chamber.

3. The controllable vibration damper as in claim 1, further comprising a further aperture disposed between the pressurizing medium line associated with the upper operating rebound volume and the fifth check valve.

4. The controllable vibration damper as in claim 3, wherein the aperture and further aperture are different sizes.

5. The controllable vibration damper as in claim 1, wherein the two high pressure chamber check valves and the two low pressure chamber check valves four check of the bridge circuit comprise settable spring elements.

6. The controllable vibration damper as in claim 1, wherein the main slide-gate and the pilot valve are each connected across a hydraulic control line with the pilot chamber.

7. The controllable vibration damper as in claim 1, wherein the pressurizing medium line connected with the lower operating compression volume is connected with a base valve.

8. The controllable vibration damper as in claim 1, further comprising a blow-off valve connected between the two pressurizing medium lines.

9. The controllable vibration damper as in claim 1, wherein the pilot valve is a 3/3 proportional valve, wherein a third aperture or a further check valve is connected between an output of the pilot valve and the low pressure chamber.

10. The controllable vibration damper as in claim 1, wherein the pilot valve comprises an electromagnet through which the flow of a pressurizing medium is enabled.

11. The controllable vibration damper as in claim 10, wherein the electromagnet comprises a tappet with a first end and second and that is movable along a longitudinal axis, wherein the first end actuates a closure element and projects into the low pressure chamber and the second end projects into a magnet chamber.

12. The controllable vibration damper as in claim 11, wherein the tappet comprises a channel through which a pressurizing medium is enabled to flow and which fluidically connects the low pressure chamber and the magnet chamber.

13. The controllable vibration damper as in claim 12, wherein the tappet is implemented in the form of a cylinder and has a first diameter, wherein the closure element has a second diameter differing from the first diameter, wherein the channel of the tappet is connected at the first end of the tappet with fourth aperture and at the second end of the tappet is connected with fifth aperture, wherein sizes of the forth and fifth apertures are adapted to the first diameter and to the second diameter.

14. A controllable vibration damper, comprising:
a piston movable back and forth in an operating cylinder, which piston divides the operating cylinder into an upper operating rebound volume and a lower operating compression volume, wherein both operating volumes are each connected across a pressurizing medium line with a valve device, wherein the valve device comprises:
a bridge circuit comprising two high pressure chamber with four check valves that are oppositely connected and two low pressure chamber check valves that are oppositely connected, wherein a connection of a first bridge section with the two high pressure chamber check valves frames a high pressure chamber, and a connection of the second bridge section frames with the two low pressure chamber check valves frames a low pressure chamber,
a hydraulic main slide-gate disposed between the low pressure chamber and high pressure chamber,
a pilot chamber, and
a controlled pilot valve across which the pilot chamber is in connection with the low pressure chamber, wherein the pilot chamber is in connection with the high pressure chamber across an aperture.

15. The controllable vibration damper as in claim 14, wherein the pilot valve comprises an electromagnet through which the flow of a pressurizing medium is enabled.

16. The controllable vibration damper as in claim 15, wherein the electromagnet comprises a tappet with a first end and a second end and that is movable along a longitudinal axis, wherein the first end actuates a closure element and projects into the pilot chamber and the second end projects into a magnet chamber.

17. The controllable vibration damper as in claim 16, wherein the tappet comprises a channel through which the pressurizing medium is enabled to flow and fluidically connects the pilot chamber and the magnet chamber.

18. The controllable vibration damper as in claim 17, wherein the tappet is a cylinder and has a first diameter, wherein the closure element has a second diameter differing from the first diameter, and
wherein the channel of the tappet opens out at the first end into the pilot chamber and at the second end of the tappet is connected with second aperture,
wherein a size of a first aperture, across which the pilot chamber is in connection with the high pressure chamber, and a size of the second aperture are adapted to the first diameter and to the second diameter.

19. The controllable vibration damper as in claim 14, wherein the valve device is integrated into the piston and/or a piston rod of the piston.

* * * * *